Feb. 27, 1973  D. R. HERING ETAL  3,718,194
METHOD AND APPARATUS FOR ORIENTING A BOREHOLE DEVICE
Filed Nov. 4, 1970  5 Sheets-Sheet 1

INVENTORS
JAMES M. LINDSEY
DONALD R. HERING

John E. Holder
ATTORNEY

Feb. 27, 1973  D. R. HERING ETAL  3,718,194
METHOD AND APPARATUS FOR ORIENTING A BOREHOLE DEVICE
Filed Nov. 4, 1970  5 Sheets-Sheet 2

INVENTORS
JAMES M. LINDSEY
DONALD R. HERING

John E. Holder
ATTORNEY

INVENTORS
JAMES M. LINDSEY
DONALD R. HERING

ATTORNEY

INVENTORS
JAMES M. LINDSEY
DONALD R. HERING

John E. Holder
ATTORNEY

United States Patent Office 3,718,194
Patented Feb. 27, 1973

3,718,194
METHOD AND APPARATUS FOR ORIENTING A BOREHOLE DEVICE
Donald R. Hering and James M. Lindsey, Houston, Tex., assignors to Sperry-Sun Well Surveying Company, Sugar Land, Tex.
Filed Nov. 4, 1970, Ser. No. 86,877
Int. Cl. E21b 47/022, 47/12
U.S. Cl. 174—45
42 Claims

ABSTRACT OF THE DISCLOSURE

This invention relates to an orienting tool which is positioned in a drill pipe and provided with a conductor cable to the surface. A pendulous instrument in the tool provides a measurement for indicating the high side of the tool in the wellbore. Instrument measurements are transmitted by the conductor cable to the surface for surface read-out. A surface indicator provides the read-out in a manner which is indicative of degrees of rotation of a reference on the tool to the right or left of the high side of the hole. The tool may then be rotated and subsequent readings taken to determine the position of the tool until the bit is oriented, whereupon drilling proceeds. Such readings can be taken continuously throughout the drilling operation.

BACKGROUND OF THE INVENTION

The present invention pertains to a drill orienting tool and more particularly to a method and apparatus for orienting a drill during drilling operations while at the same time providing surface indications of the orientation of such drill.

When making boreholes into the earth's surface, it is often desirable for various reasons to deviate the holes from a vertical course through earth formations. The term "directional drilling" is applied to such operations. One example of the use of such directional drilling operations is found in the drilling of oil wells from offshore platforms. It is a common practice to build a large drilling platform which is permanently secured to the ocean floor and from which a multiplicity of wells are drilled, sometimes over forty in number. Because of the number of wells which are drilled from a single platform, it is necessary to drill the holes laterally away from the platform so that earth formations containing petroleum reservoirs may be penetrated at distances laterally spaced from the platform. This procedure permits production from as great an area as possible from a single platform. The economics of such a system can readily be appreciated. It is also easily understood how important the maintenance of direction and dip of such boreholes is in order to penetrate particular formations at particular depths and thereby intersect the desired petroleum reservoirs.

A present technique for obtaining such information as to the direction of a borehole is to cease drilling and run a surveying instrument into the drill pipe on a wireline. Alternatively, the instrument may be go-deviled to the bottom of the drill pipe. The instrument is oriented with respect to the drill stem by means of a "muleshoe" located in the lower end of the drill stem. The "muleshoe" is simply a device for capturing the tool at the lower end of the drill stem and orienting the tool in a particular radial direction with respect to a predetermined point on the drill stem. For example, the drill stem normally used in such a directional drilling operation has what is termed a "bent sub" at its lower end which angles the lower end of the stem and thereby permits angular deviation of the drill bit. The muleshoe is normally oriented with respect to the bent sub. This in turn orients the instrument which is being positioned in the lower end of the drill stem. This series of procedures provides a correlation between the direction in which the drill bit is angled and the directional alignment of the survey instrument. After the survey instrument is operated to generate a record, generally by means of a timing mechanism, the tool is retrieved to the surface by means of a wireline. This operation is time consuming and costly, and in particular, in offshore operations where the cost of drilling is many fold that of land operations, the economies of decreasing the non-drilling time is readily appreciated.

It is therefore an object of the present invention to provide a new and improved device for determining the orientation of a drilling member and providing an immediate surface indication of such orientation.

SUMMARY OF THE INVENTION

With this and other objects in view, the present invention contemplates a method and apparatus for determining the orientation of a drill and presenting a surface indication of such orientation without removing the apparatus from the borehole. The apparatus includes an instrument member which locates a predetermined position in the borehole such as the low side of the borehole. The instrument in turn is oriented with respect to the drill. Indications of the predetermined position in the borehole provided by the instrument member are transmitted to the surface and are indicative of the particular rotated position of the drill with respect to such predetermined position at that time. A surface indicator presents a visual display showing degrees of rotation of the drill to the right or left of the predetermined position in the borehole. The method of operation permits a continuation of drilling operations with the tool position in the drill pipe so that readings can be continuously made during the drilling operation.

A complete understanding of this invention may be had by reference to the following detailed description, when considered in conjunction with the accompanying drawings, illustrating embodiments thereof.

BRIEF DESCRIPTION OF THE DRAWINGS

FIG. 4 is a partial sectional view showing details of

DESCRIPTION OF THE PREFERRED EMBODIMENTS

Figure 1:
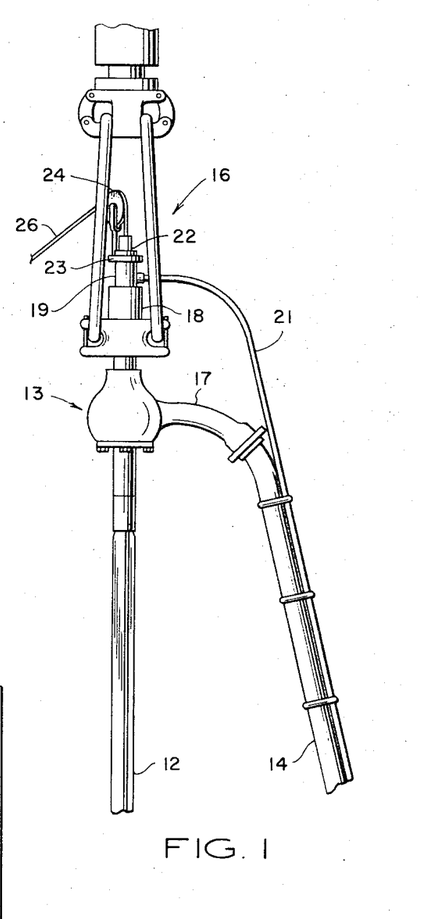
FIG. 1 shows an arrangement at the surface for passing a conductor cable through the upper end of a swivel and drill pipe to permit its placement therein during a drilling operation.

Referring first to FIG. 1 of the drawings, a portion of a drilling apparatus which is positioned above the floor of a drilling platform is shown including a kelly 12 depending from a swivel 13, which is connected with a mud line 14. A bail 16 holds the upper end of the swivel in place. A goose neck 17 connects the swivel with the mud line. The swivel is furnished with a wireline opening boss 18 in its upper side which is machined for thread closure enabling a line wiper 19 to be received in the upper end thereof. Such line wipers may be purchased from oil well drilling apparatus suppliers, and are constructed to seal off well pressure at the well head during line operations through the drill pipe. Typically such line wipers include a hydraulically actuated packing member (not shown) in the interior of the wiper. The packing member is actuated by applying pressure into the apparatus by means of an external pressure line 21 which in turn may be connected to a grease pump or the like (not shown) for applying grease under pressure to the interior of the line wiper. The grease line is shown entering the side of the line wiper and extending downwardly along the side of the mud line. A top block 22 is positioned on the upper end of the line wiper and is arranged to swivel about the upper end of the wiper by means of bearings or a bearing surface between an adapter ring 23 and the upper end of the line wiper. A sheave 24 is positioned on the top block for passing a conductor cable 26 into and through the line wiper. The conductor cable is maintained on a motor driven drum (not shown) which permits its play-out and take-up during the operations. For the purposes of this invention, the cable is a single conductor cable having an armored covering and similar in construction to well logging cables.

Figures 2, 3A, 3B:
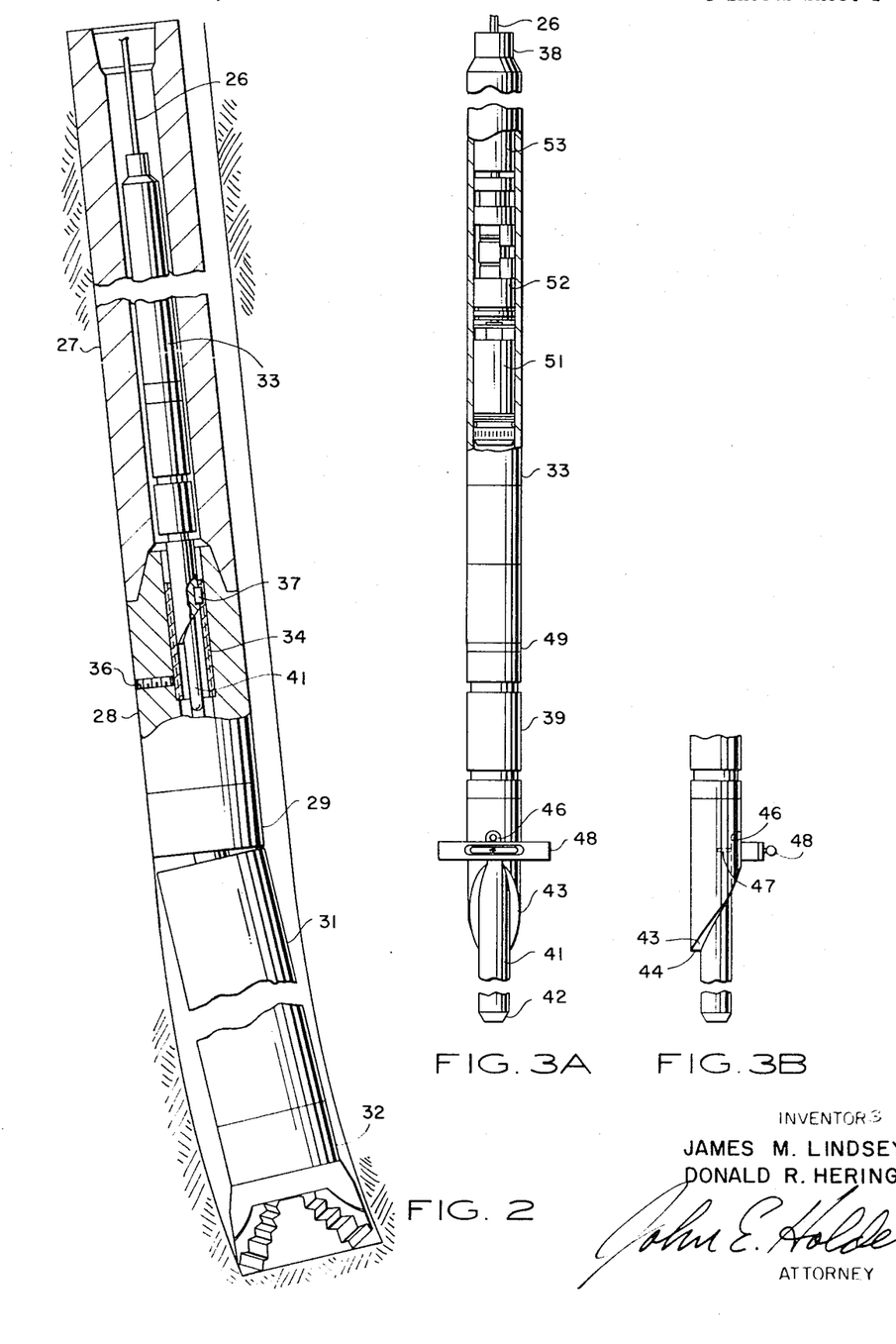
FIG. 2 shows a schematic diagram of the lower portion of the drill stem, including a rotating bit sub and mud motor together with an apparatus for receiving and positioning the orienting tool in the lower end of the drill pipe.
FIGS. 3A and 3B are schematic views of the orienting tool.

Referring to FIG. 2, the lower end of a drill stem is shown including a non-magnetic drill collar 27 and muleshoe orienting sub 28. A bent sub 29, a mud motor 31, and a rotating bit sub 32 are positioned below the orienting sub. An orienting tool 33 is positioned below the orienting sub. An orienting tool 33 is shown positioned within the interior bore of the drill collar and is connected at its upper end with the conductor cable 26 extending to the surface. As will be described, the orienting tool provides surface indications to equipment at the top of the wellbore. A muleshoe sleeve 34 is positioned within the muleshoe orienting sub 28 and is oriented therein in a predetermined fashion. The sleeve 34 is held in the predetermined orientation with the sub by means of a screw or the like 36 extending through the side wall of the sub 28. The muleshoe sleeve 34 has a key 37 positioned in its sidewall and extending inwardly into its interior bore. The muleshoe sleeve and its key are normally oriented with respect to the bent sub and thus with respect to the drill bit which derives its direction of inclination by means of the bent sub. This predetermined alignment of the muleshoe key with respect to the bent sub is convenient for purposes of determining the orientation of the drill with respect to surface indications of tool direction and providing compensating changes in drilling direction; however, other orientation techniques and parameters could be used. The muleshoe sleeve 34 has longitudinal slots formed therein which provide a mud circulating bypass through the sleeve when a tool string is positioned therein.

FIGS. 3A and 3B of the drawings show the orienting tool 33 including an adapter 38 at its upper end for connection of the tool with the conductor cable 26. A muleshoe 39 is secured to the lower end of the tool string.

The muleshoe includes a protruding shaft 41 having a tapered end 42 for guiding the shaft 41 into the muleshoe sleeve 34. A beveled shoulder 43 extends spirally around opposite sides of the protruding portion meeting at a pointed terminal 44. On the opposite side of the tool, the beveled portions 43 meet to form a longitudinally extending slot 46. The slot 46 is sized to receive the inwardly extending key on the muleshoe sleeve 34 when the tool is positioned in the drill pipe. As shown in FIG. 3A, a hole 47 extends downwardly in the slot towards the center of the tool. The hole 47 is arranged to receive a leveling device 48 which has a pin depending therefrom for insertion into the hole.

The orienting tool further includes a muleshoe adjuster which permits rotation of the muleshoe 39 relative to the tool string 33. The adjuster includes mating portions (not shown) between the muleshoe and tool string to permit relative rotation therebetween and a locking collar 49 for securing the tool string and muleshoe in a fixed relatively rotated position. The tool string 33 houses a pendulum section 51, which will be described hereinafter in greater detail, which is used for determining the bottom side of the hole by means of gravity operated elements. A lamp and photocell scanning section 52 is located in a portion of the tool adjacent the pendulum section, and provides an electrical indication of the tool's orientation for transmittal to the surface. An electronic section 53 for coding electrical signals for transmittal to the surface is included in the tool string.

Figure 4:
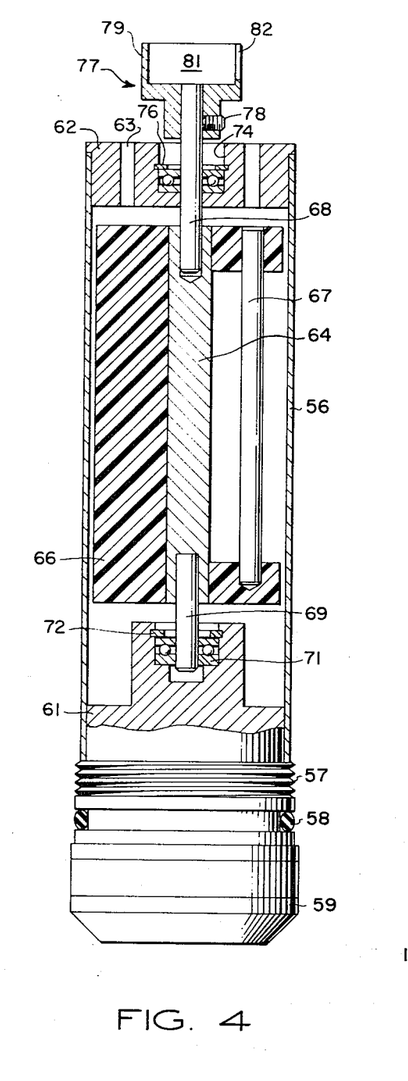

Next referring to FIG. 4 of the drawings, a detailed view of the pendulum section 51 in the tool string 33 is shown. The pendulum assembly includes an outer cylindrical housing 56 having a threaded end portion 57 to accommodate reception of the pendulum section within the tool string. An O-ring seal 58 is received within a groove about the lower end of the housing and forms a fluid tight seal between the housing and the interior bore of the tool string. A lower mounting block 61 is positioned within the lower end of the housing 56 and an upper mounting block 62 is positioned in the upper end of the housing. Vertical holes 63 are provided through the block 62 to provide means for transmitting fluids between the upper end of the upper block 62 and the interior bore of the housing enclosed by the upper and lower blocks 61, 62. The pendulum assembly includes a central core portion 64 made of a lightweight metal. A cylindrical body 66 is positioned about the central core 64. The body 66 is made of a lightweight plastic material which has a low specific gravity permitting it to be buoyant in a fluid filling the housing. The fluid which fills the pendulum section is of sufficient viscosity to provide a dampening effect on the movement of the pendulum therein. On one side of the core 64, the plastic body 66 is cut away throughout a substantial portion of its length, and has a steel rod 67 positioned between spaced end portions of the plastic material. Upper and lower shaft members 68, 69, are press-fitted into the ends of the central core. The shafts 68, 69 each have ball bearings 73, 71 respectively fitted thereon. The lower ball bearing 71 is positioned in a recess in the lower block 61 and maintained therein by means of a snap ring 72. The upper bearing 73 is received within a bore 74 formed in the upper block 62 and is likewise held therein by means of a snap ring 76. The upper shaft 68 extends upwardly through the block 62 and has a cup member 77 secured thereon by means of a set screw 78. The cup member has a thin peripheral wall 79 defining the outer perimeter of a hollow chamber 81. A slot 82 is formed in the wall 79 of the cup and is parallel with the longitudinal axis of the shaft 68.

Figure 5:
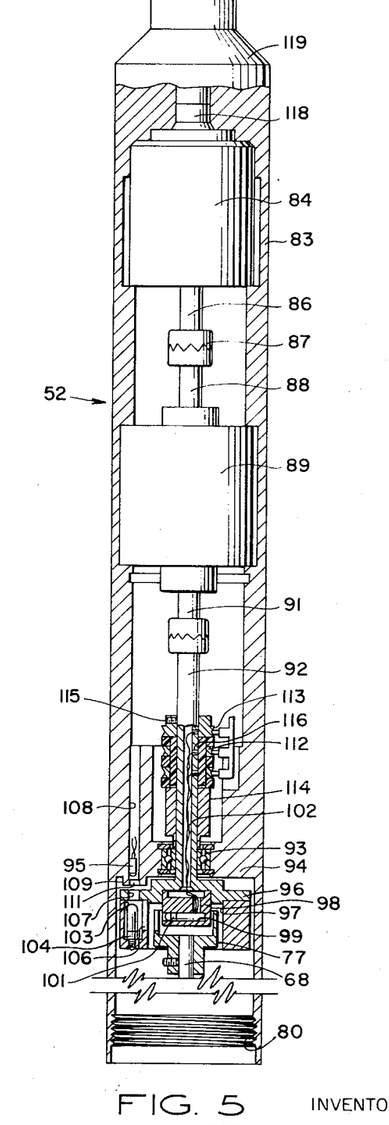
FIG. 5 is a sectional view showing details of other portions of the borehole orientation instrument for assembly with the portion shown in FIG. 4, but drawn to a smaller scale.

Referring next to FIG. 5 of the drawings, the scanning section 52 is shown in detail. This section has an outer housing 83 which has a threaded end portion 80 for receiving the threaded portion 57 of the pendulum section 51. It is to be noted that FIG. 5 is drawn to a smaller scale than FIG. 4. The cup member 77 on the pendulum assembly is shown in FIG. 5 in its cooperative arrangement with the scanning section. The detector and scan assembly in the section 52 includes the outer housing 83, having a synchronous motor 84 positioned in the housing near its upper end. An output shaft 86 from the motor is coupled by a multi-jaw coupling 87 with an input shaft 88 to a speed reducer 89. An output shaft 91 from the speed reducer is likewise coupled to the upper end of a scanner shaft 92. The shaft 92 has a ball bearing 93 fitted about the shaft. The ball bearing is received within a block portion 94 positioned within the lower end of the housing 83. The bearing 93 is held in the block by retaining rings above and below the bearing. A lamp and photodetector housing 96 is positioned on the lower end of the shaft 92 and has an annular recess 97 formed on the bottom of the central portion of the housing 96 for receiving the cup shaped member 77 extending upwardly from the pendulum assembly. A cylindrical block 98 formed in the center of the recess has a lateral opening 99 sized for receiving a light sensitive device 101 such as a photocell. Appropriate passages in the block communicate with a longitudinal bore 102 in the shaft 92. The passages and bore provide a means for the passage of conduction wires to electrical devices in the housing 96. The housing 96 also has a cylindrical recess 103 extending upwardly from its lower surface near one peripheral edge thereof for receiving a light source 104 such as a lamp therein. A slot 106 is formed in the wall of the cylindrical recess 103 to provide a slotted opening between the lamp and the annular recess 97. The slot is arranged so that it is opposite the lateral opening 99 in the block 98 which opening also communicates with the annular recess 97. Another slot 107 is formed in the top of the cylindrical recess 103 which corresponds in a radial position on the housing 96 with the slot 106 in the inner wall of recess 103 so that the slot 107 is on the same radial spoke as the slot 106.

A longitudinal opening 108 extends through the block portion 94 for receiving a second light sensitive device 95 such as a photocell at its lower end. The lower end of the opening 108 has a closure 109 with a slot 111 therein which is positioned radially to the central axis of the housing 96. The light sensor 95 positioned in the longitudinal opening 108 will be hereinafter referred to as a case reference light sensor.

A series of collector rings 112 are positioned about the shaft 92 and are held thereon by means of upper and lower collars 113, 114, positioned above and below the collector rings. The upper collar is held on the shaft by means of a set screw 115. The collector rings are insulated from the metal portions of the shaft. Slots 116 are formed in the wall of the hollow shaft 92 to permit passage of insulated wires from the collector rings to the photocell 101 and lamp 104 positioned in the housing 96 at the lower end of the shaft. Electrical power is supplied to the scanner assembly including the synchronous motor 84 by means of a connector 118 at the upper end of the housing. A connecting head 119 at the upper end of the tool housing is attached to a single conductor armored cable 26. The armored wires and cable are connected to the head 119 in a well known manner for providing an electrical connection between such members, and also for permitting suspension of the tool housing from the armored portion of the cable The synchronous motor 84 positioned within the housing 82 operates at a speed of 12,000 r.p.m. on a 400 cycle power signal. The speed reducer 89 provides a reduction of 100 to 1 so that for every 100 turns of the shaft 86, the shaft 91 extending from the other end of the speed reducer 89 and connecting with the scan shaft 92 rotates at 2 revolutions per second.

The interior bore of the housing 83 below the motor 84 is filled with a fluid which not only lubricates the moving parts therein such as bearings, but also provides a dampening effect as will be described hereinafter with respect to the pendulum assembly attached to the lower end of the housing 83.

Referring to FIG. 4, the openings 63 formed in the upper block 62 of the pendulum assembly permit the fluid in the housing 83 to communicate with the interior bore of the pendulum housing 56. Preferably the fluid does not stand above the coupling 87 between the motor and speed reducer so that the synchronous motor is not drowned by the fluid.

Figure 6:
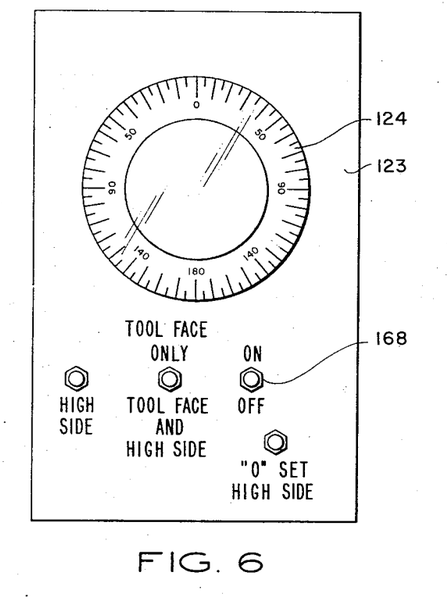
FIG. 6 is a front view depicting the face of the surface apparatus for providing visual indications of parameters measured by the borehole instrument.
Figure 7:
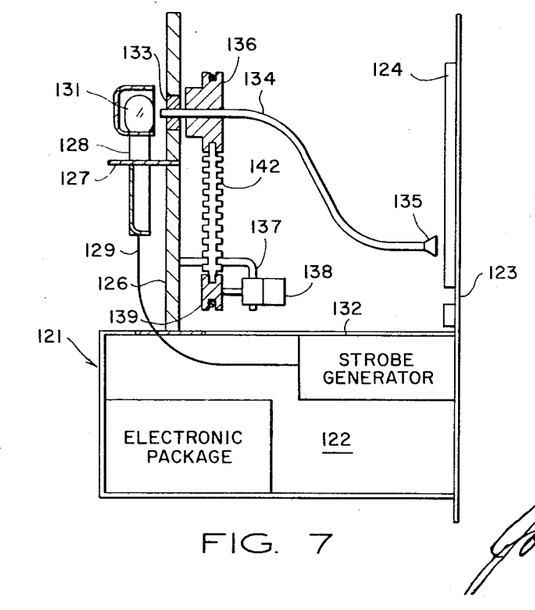
FIG. 7 is a side view of such surface indicating apparatus showing the mechanism for providing such indications.

Referring next to FIGS. 6 and 7 of the drawings, surface equipment for providing a read-out of information from the pendulus and scan sections is shown. The read-out apparatus is comprised of a lower base portion 121 having a hollow interior 122 for receiving components of the system. A front panel 123 has a circular opening therein with a translucent plastic or glass plate 124 placed over the circular opening. Indicia in the form of a radial scale is placed on the plate 124 by means of silk screening or the like. The scale is arcuate and is marked off in radial degrees from 0 to 180, and on both the right and left sides of the scale. Toggle type switches are mounted on the front panel and provide means for operating the surface recording apparatus as will be described hereinafter. A back panel 126 extends upwardly from the base 121 of the surface recorder and has a first mounting bracket 127 thereon extending rearwardly from the panel 126. Mounting bracket 127 has an opening therein for receiving a strobe light unit 128 including a strobe lamp 131. Electrical wires 129 connect the strobe light unit with a strobe generator 132 mounted in the interior 122 of the apparatus. The strobe generator and light unit may be the same as those popularly used in photographic operations and which are produced by several manufacturers. An opening is provided in the center of the back plate for receiving a bearing 133 such as a ball bearing, which in turn rotatably supports one end of a Lucite rod extending through the opening. This rod 134 extends between the back and front panel members 126, 123 respectively and is curved along its length so that its unsupported end 135 adjacent the front panel 123 is in close proximity to the scale on the plate 124. In other words, the circular path followed by the rod end 135, when rotated, is approximately coincidental with the arcute scale on plate 124. A great pulley 136 is mounted on the rod 134 near its bearing supported end, with the pulley being locked on the rod by means of a set screw or the like for rotation therewith.

On the inside wall of the rear panel 126 towards its bottom edge is mounted an L-shaped bracket 137 for supporting a synchronous motor 138. This synchronous motor 138 is operated by the same power supply which operates the downhole synchronous motor 84 described with respect to FIG. 5 of the drawings. Another geared pulley 139 is mounted on an output shaft driven by the synchronous motor 138. The pulley 139 is aligned laterally with the geared pulley 136 on the Lucite rod. A positive drive belt 142 extends around geared pulleys for rotating the Lucite rod in response to the rotation of the synchronous motor shaft. The belt has cogs which cooperate with gear teeth on the pulleys to provide a positive no-slip movement of one pulley relative to the other. The bearing supported end of the Lucite rod 134 is aligned with the center of the scale plate 124 shown in FIG. 6. The other end 135 of the rod was a flattened portion thereon aligned axially with the indicia on outer edge of the scale.

Figure 8:
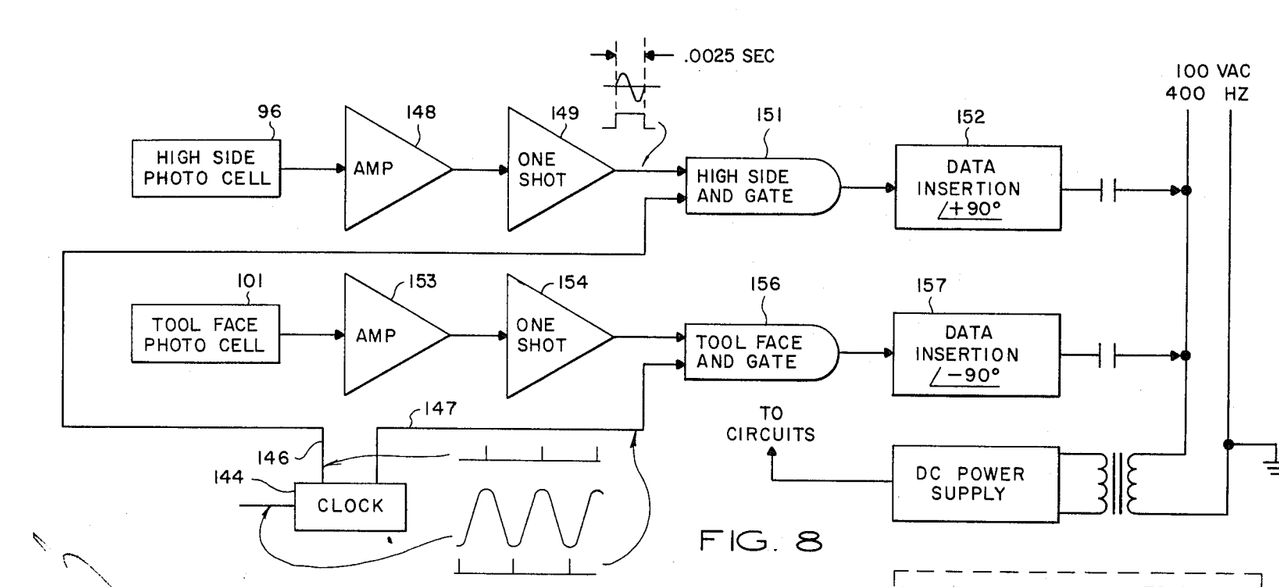
FIG. 8 is a schematic block diagram of an electrical circuit for transmitting downhole detected orientation information to the surface.

Referring now to FIG. 8 of the drawings, a schematic wiring diagram for the downhole electrical system is shown. The system includes a clock circuit 144 which generates two sets of signals having different phase relationships related to the alternating current signal which drives the clock. One clock output 146 is a 50 microsecond pulse occurring at 90° with respect to the 400 Hz. AC signal which is supplied via the single conductor cable to the downhole equipment. The other output 147 is a pulse occurring at a 90° period relative to the AC signal. These two clock generated signals will be gated onto the power line signal at appropriate intervals as will be described hereinafter.

To understand the operation of the circuit of FIG. 8 with respect to the scanner of FIG. 5, light from the scanner lamp 104 strikes the case reference photocell 95 which generates a signal within the well tool. The case reference photocell 95 will hereinafter be referred to as the high side photocell. This signal is amplified by means of a photocell amplifier circuit 148 and passed onto a one shot, 149 comprised of a series of monostable multivibrators. The one shot inverts the signal and lengthens the pulse width to "stretch" the pulse width of the signal to equal to the period of the power signal. These signals passing from the one shot 149 are then fed to a high side AND gate 151 which causes the AND gate to conduct and pass the clock output pulses 146 occurring at the plus 90° portion of the power signal. The clock signal passed from the AND gate is fed to a data insertion circuit 152 where it is used to cause conduction of a semiconductor in the data insertion circuit. The semi conductor has as its collector load a capacitor in series with the power line. When the semiconductor saturates, it puts a spike or pulse on the power supply signal at the time that it goes into saturation or in the above example, at the positive 90° portion of the power supply signal. In the circuit thus far described, since the photocell initiated signal which emanates from the one shot 149 has been stretched to equal the time period of the power signal, no matter where the photocell signal occurs relative to the period of the power signal, there will always be one clock output pulse 146 gated onto the power line at the positive 90° portion of the power signal. This is true no matter where the photocell signal occurs in time relation to the period of the power signal.

The other portion of the scanning system includes the tool face photocell 101 which is positioned in the housing 96 on the lower end of the scan shaft 92. Photocell 101 is activated when the slot 82 on the cup member 77 (on the pendulus assembly) passes between the lamp 104 and the tool face photocell 101. When this occurs, a signal is passed to a photocell amplifier 153, which in turn amplifies and shapes the signal for passage to a one shot 154. Again, the one shot is comprised of a series of monostable multivibrators which are used to stretch the photocell signal into a pulse that is equal to the period of the power supply signal. This signal from the one shot 154 is passed into a tool face AND gate 156 to operate the gate for passing the clock output signal 147 also provided to the gate 156. The clock signal being passed through the tool face AND gate is a pulse occurring in time relationship with the minus 90° portion of the power signal. Thus, when the AND gate 156 operates, one clock pulse 147 is passed through the gate no matter where the photocell signal occurs in time relationship to the power signal. This clock pulse 147 is fed to a data insertion circuit 157 which inserts the pulse on the power line signal similarly to technique described above with respect to the high side data insertion circuit.

In the system described above, the signals generated by the scan system in the downhole tool are superimposed onto the power signal so that signals passed to the surface at the positive 90° portion of the power signal are related to the high side photocell activation and signals at the negative 90° portion of the power signals are related to the tool face photocell detector. These signals, as will be described, are used to operate the surface readout apparatus.

Figure 9:
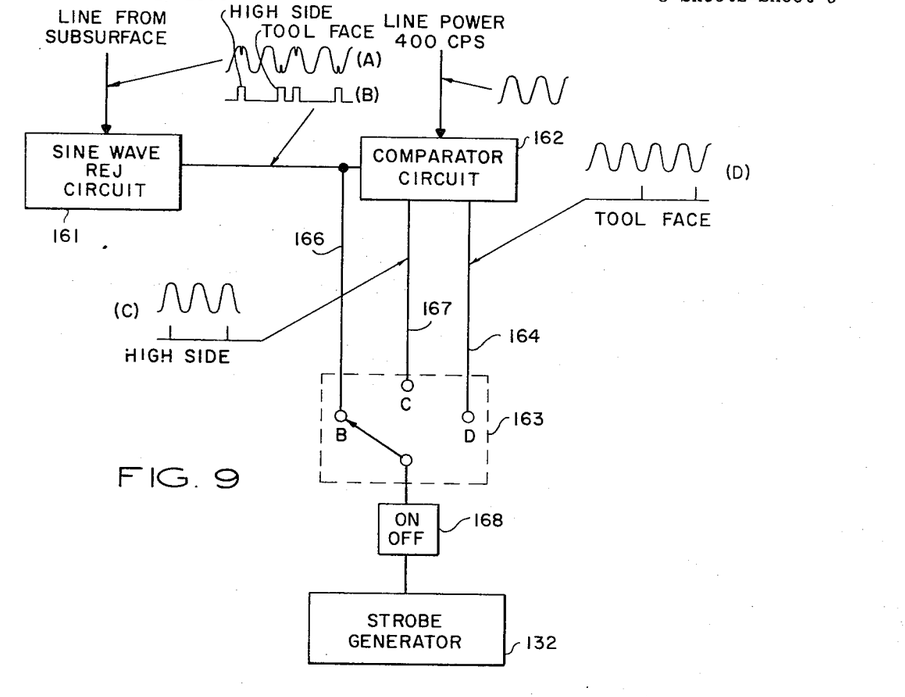
FIG. 9 shows a schematic block diagram of an electrical circuit for receiving such information at the surface and providing signals to the surface read-out equipment.
Figure 9A:
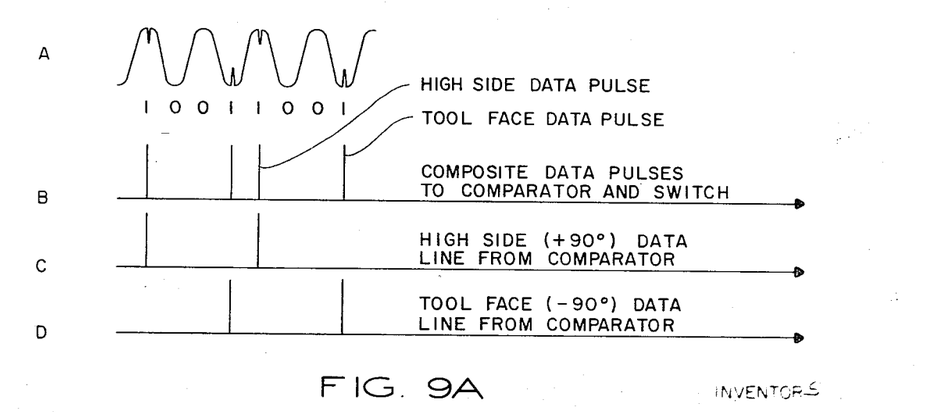
FIG. 9A shows a schematic diagram representing pulses at various points in the circuit of FIG. 9.

At the surface the composite signal (A) FIG. 9, which has now been superimposed upon the power signal, is passed through a data processing system which includes a sine wave rejection circuit 161. The diagrammatic signals are shown in relation to their location in the circuit in FIG. 9 as well as in a comparative form in FIG. 9A.

The sine wave rejection circuit rejects the 400 cycle component of the sine wave to provide data pulses as represented at (B) in FIG. 9. The data pulses are synchronous with the +90° and —90° portions of the sine wave signal, at which times on the signal data was inserted thereon by means of the downhole circuitry. These data pulses represent the high side pulses occurring at the +90° position relative to the line signal and the tool face pulses at the —90° position relative to the line signal. This combination of data pulses is then sent to a comparator circuit 162 which is comprised of a clock and an AND gate for each data phase and also sent to a three position switch 163 by means of circuit path 166. The comparator circuit separates the high side pulses from the tool face pulses by comparing the pulses with the line frequency period. Those pulses that occur on the positive 90° portion of the signal are separated from those that occur on the —90° portion and put on separate lines. These separated pulses thus emerge from the comparator circuit as represented by lines C and D of FIG. 9A and pass to the three position switch 163 by means of conductor paths 167 and 164, respectively.

The surface indicating equipment of FIGS. 6 and 7 is operative in response to the signals received from the circuit of FIG. 9 in the following manner. Depending upon the position of switch 163 one or more of the signals B, C, or D is passed to the strobe generator 132. When the switch 163 is in position D, the strobe generator fires only when the signal from the corresponding photocell downhole puts the signal on the line. In position B the strobe fires upon activation of each photocell, thus both the high side and tool face signals are displayed. Thereupon the strobe generator fires to momentarily light the lamp 131 on the strobe 128. Light emanating from the lamp 131 is directed onto the end of Lucite rod 134 adjacent the lamp. The Lucite rod conducts the light down the rod to its opposite end 135 where the light is directed onto the instrument plate 124. The end 135 of the rod is arranged so that light emanating therefrom in the form of a beam is opposite the scale which is placed about the periphery of plate 124. Because of the translucency of plate 124 the light beam is superimposed on the scale. The strobe lamp 131 is not continuously operated, but rather is activated only by the data signal derived from downhole equipment. Thus the light appearing on the scale is intermittent and coincident with data signals. The Lucite rod 134, from which the light beam is directed, is rotatable by means of the synchronous motor 138 on the surface indicator. The motor 138 is driven by the same power supply as motor 84 in the scanning system, and has an equivalent speed reduction mechanism incorporated in the motor housing, so that the Lucite rod 134 makes one revolution about the scale for every revolution of scan shaft 92 in the downhole scanner. Thus, if a reference correlation is made at the surface between the light beam position on the surface indicating scale and a known reference on the tool a similar correlation will exist when the tool is downhole and the orientation of such known reference can be followed at the surface. Such a technique for making this correlation will be described hereinafter with reference to the overall operation of the system.

The relation between the downhole detection and scan system relative to the surface indicator will now be described. In the downhole tool shown in FIGS. 4 and 5, the weighted rod 67 in the pendulum section 51 will seek the low or gravity side of the wellbore. The pendulum assembly is arranged to turn within its housing so that the pendulum is at all times free to turn therein. The cup 77 which is attached by means of shaft 68 to the pendulum is free to rotate therewith. As the cup 77 rotates, a slot 82 in the wall 79 of the cup, permits light to pass therethrough. Therefore, as shown in FIG. 5, when the scan shaft 92 turns, the lamp 104 and the photocell 101, which turn with shaft 92, periodically pass the slot 82 in cup 77. Since the lamp and photocell are oppositely aligned when slot 92 passes between them, the photocell 101 is activated by the lamp 104 to provide a signal. As described previously with respect to FIGS. 8 and 9, this signal is superimposed on the power supply signal and sent to the surface indicating equipment.

In a similar manner a reference signal is generated by rotation of shaft 92 when an opening 107 in the housing 96 permits periodic light passage from the lamp 104 onto a reference or high side photocell 95. This also generates a periodic signal upon each revolution of shaft 92. Thus, upon each revolution of shaft 92 a signal is generated by each of the photocells and passed to the surface indicating equipment.

Figure 10:
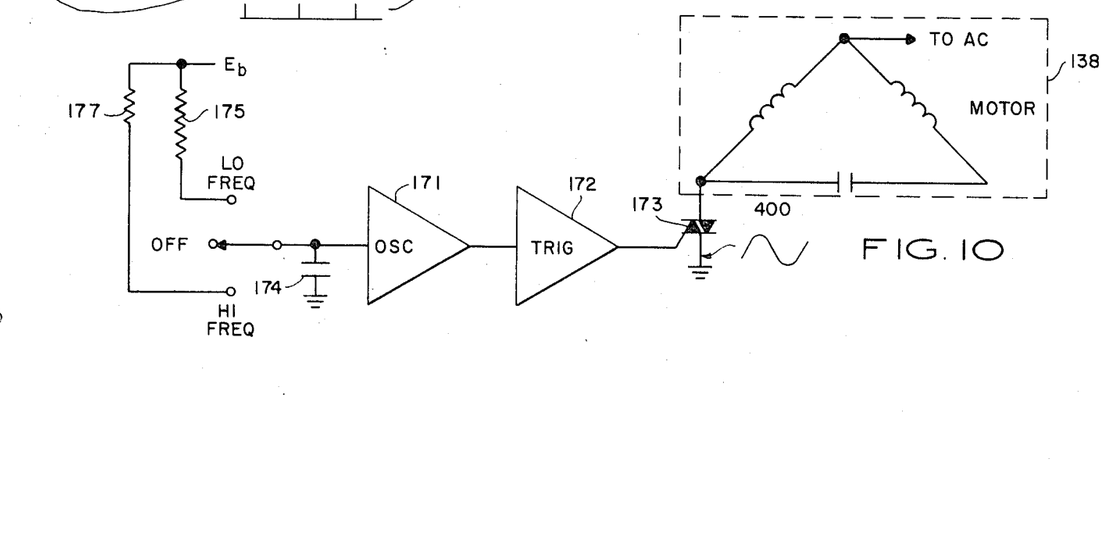
FIG. 10 is a schematic block diagram of a desynchronizing circuit for use with the surface equipment of FIGS. 6 and 7.

Referring next to FIG. 10 of the drawings, a circuit is shown for desynchronizing the synchronous motor 138 in the surface indicating equipment. The circuit is comprised of a variable oscillator 171 and trigger 172 which are used to gate a power device 173 such as a triac. The power device, an AC bi-directional switch, controls the application of an AC current to the synchronous motor 138. The RC oscillator 171 is fed by a DC line voltage, which in turn is fed through high and low resistances 175, 177 respectively, to control the frequency output of the oscillator. The oscillator is a uni-junction transistor which is open until a breakover voltage is reached, whereupon it fires and discharges a capacitor 174. This in turn sends a pulse to the trigger device 172, which is an NPN transistor. When no voltage is supplied by the oscillator 171 to the trigger 172, the DC line voltage is passed by the transistor to apply a constant voltage to the triac power device 173 and thus keep the triac turned on. If a positive voltage is applied by the oscillator 171 to the NPN transistor, it conducts and closes the device to ground and thus prevents an output voltage to the triac 173 which turns the device off. When the triac is turned off, it does not pass the AC line voltage to the synchronous motor 138. This circuit provides a means of purposely causing a synchronous motor to "drop sync" or reduce speed by using a variable oscillator to drive a triggering device which in turn gates a triac power device.

In the operation of the circuit described above, if the oscillator is in in the off position, the triac trigger provides a constant voltage to the triac keeping it turned on, and therefore running the motor at a synchronous speed. If the oscillator 171 is started, a pulse signal output of the oscillator, that is, every pulse that occurs momentarily, turns the trigger 172 off. Each time the triac turns off, it slows the operation of the motor. The frequency at which such turn offs occur will be in proportion to the oscillator frequency. The faster the period of oscillation, the more frequently pulses are passed to the trigger and the slower the motor runs. As shown in FIG. 10, means in the form of two resistance paths are provided for passing a variable voltage to the oscillator to thus provide variations of frequency output. This variable voltage supply simply comprises two lines having small and large resistances therein for controlling the voltage. It is readily seen that a device could be employed which would give an infinitely variable resistance control and thus variable oscillator output to the system.

In the operation of the well tool system described herein, the following method is employed in the operation of the system. At the surface before the tool string 33 is inserted in the drill pipe, the level 48 (FIG. 3) is positioned in the hole 47 in the slot 46 on the muleshoe 39. The top side of the slot is then level and with the earth's surface. This may also be accomplished by inserting a rod or the like in the hole 47 in the muleshoe slot and sighting with the eye to align the rod with the vertical. Next, the surface recording equipment shown in FIGS. 6 and 7 is turned on and the switch marked high side is depressed to complete a circuit for providing an indication of the high side of the tool. Such indication is in the form of a flashing light which will correspond to the activation of the case reference photocell 95 in the downhole tool. This light will appear somewhere on the scale on plate 124 of the surface recording instrument. Since during this calibration operation, the instrument is not being moved, the light beam should repeatedly occur at periodic intervals at the same position on the scale. The appearance of the flashing light beam will coincide with movement of the scanner housing 96 past the lamp 104 and thus passing light on to the detector photocell 95. Since the light beam moves synchronously with the scanner, the position of the light beam occurring upon closing of the high side switch will always be relative to the position of the photocell 95 which is fixed with respect to the tool housing. Thus, when the housing is aligned with respect to vertical and the high side switch thus activated, the position of the light beam at that time on the scale is representative of the tool housing in that particular orientation.

Next, the operator operates a switch on the surface indicator called "0 Set High Side" which activates the circuit described with respect to FIG. 10 for desynchronizing the motor used to drive the light rod on the surface indicator. This desynchronization of the motor will cause the motor to temporarily run slower and thus cause the light flash to move with respect to the scale, since the motor 138 is no longer being operated synchronously with the motor 84 in the tool housing. When the light flash has moved so that it now occurs at the 0 position on the scale, the depressed toggle switch is released to permit the light flash to maintain its repeated appearance at that point on the scale. Since this 0 point on the scale is merely a reference point, it will be readily seen that the flash could be placed at any position on the scale for ready reference; however, for the sake of simplicity and minimizing errors in the operation of the system, it would probably be better to place the light at the 0 position, which now corresponds to the slot 46 in the tool housing being on top of the tool relative to the earth's surface. Upon establishing the high side light at this position, the operator turns off the high side light. The operator then moves the switch to the "Tool Face Only" position. Similarly, a flashing light will appear somewhere on the face scale, this light always occurring at a position which is relative to the position of the pendulum in the tool. The operator then loosens the locking collar 49 on the tool housing and turns the upper body portion of the tool (containing the pendulum and scan assemblies), making sure that the lower portion with the level is maintained in its present position, i.e., with the level or rod showing an "up" position. This turning of the upper portion of the tool housing is continued until the "Tool Face Only" light, which is flashing now, appears at the 0 position on the scale. When the tool face light is in the 0 or other such reference position, the portions of the housing are once again locked together by tightening the locking collar 49. The "Tool Face and High Side" switch on the surface indicator is now turned on, both light flashes will occur simultaneously at the same point on the scale. The tool system is thus calibrated and ready for lowering into the drill pipe.

In order to lower the tool into the drill pipe, the conductor cable 26 is passed over the sheave 24 of the line block, through the line wiper and opening boss in the top of the swivel, and through the kelly. Upon emergence of the cable at the lower end of the kelly, the cable is connected to the tool string at adapter 38 and the assembly is inserted into the drill pipe which is being held by means of slips on the rotary table. The kelly is then made up with the top of the pipe string, and by means of the spooling apparatus at the surface, the cable is let out whereupon the tool is lowered into the drill string. When the tool reaches the lower end of the drill string, the downwardly projecting shaft 41 on the end of the muleshoe is received within the muleshoe slot 46 to line up with the muleshoe key 37 projecting inwardly from the muleshoe sleeve 34. The muleshoe key 37 in turn has been aligned with a portion of the drill, and preferably the bent sub portion of the drill, so that it is known that the muleshoe key is pointing in the direction that the drill is pointing. Thus because the high side light is set to occur at 0 on the indicator when the slot 46 is up, the high side reading now indicates the direction the bent sub and bit is pointing as pictured in FIG. 2.

After the tool string has seated downhole, the "High Side Only" switch is activated to provide a flashing light on the scale corresponding to the signals emanating from the high side photocell. If the tool was precalibrated and then moved to the well site, the two motors will more than likely be out of synchronization. Therefore, when the tool is lowered into the wellbore, the high side photocell light will no longer occur at the same position, i.e., 0 position on the scale as during the calibrating operation. Therefore the "0 Set High Side" switch is depressed to desynchronize the surface indicator synchronous motor 138 and and permit the flashing light to drift on the scale until it occurs on the 0 position. Again, the 0 position is only used as a convenient reference. When this is accomplished, the "High Side Only" switch is moved to the "Tool Face and High Side" switch position. At this time, two flashing lights should occur on the scale, non-simultaneously. These lights will show the angular difference on the scale representing the angular difference between the slot 111 in the housing, which passes light from lamp 104 to the high side photocell 95 and the slot 82 in the cup 77 at the upper end of the pendulum assembly, which slot 82 passes light to the tool face photocell 101. This in turn represents the angular difference between the direction which the drill is pointing as a result of its being attached to the bent sub and the high side of the hole. This occurs because the pendulous member was set initially so that the slot 82 on the cup produces a signal from the tool face photocell 101 corresponding to the muleshoe slot 46 which in turn, in the hole, corresponds to the direction in which the bent sub and drill are pointing. On the surface indicator scale, this angular difference can be measured in terms of degrees to the right or left at which the bit is pointing relative to the top side of the hole.

The drilling operator now knows which way the drill must be turned in order to achieve the desired direction. Based on this information, he will continue the drilling operation, periodically taking readings from the surface indicator to determine if the corrections he is applying to the drill bit movement are providing the desired results. Slots in the muleshoe sleeve permit drilling fluid bypass around the tool string while the tool string is positioned in the drill pipe. By increasing or decreasing the rate of fluid flow through the fluid motor operating the bit, the operator can thus cause the bit sub to rotate to the right or left and thus change the course of drilling if such change is desirable. When drilling has continued to the extent that another section or stand of drill pipe need be added to the drill string, the drilling operator will then slow the circulation of mud as much as possible, whereupon the pressure on the line wiper 19 is released to the point that the conductor cable can be moved through the line wiper by rotating the reel at the surface. The tool is then retrieved to a position within the kelly 12, whereupon the tool joint between the kelly and top section of pipe is opened and another section or stand of pipe is placed in the drill string in a well known manner. Thereupon, the tool string is again lowered to the bottom of the drill string and seated in the muleshoe and the drilling operation is continued.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. A method of orienting a downhole drilling apparatus during a drilling operation wherein the drilling apparatus includes a bit operated by a fluid motor, comprising the steps of: positioning an attitude detecting tool in the drilling apparatus; continuously detecting the attitude of the drilling apparatus relative to a known downhole reference while the drilling operation is proceeding; determining from such attitude detections whether the orientation of the drilling apparatus is providing the proper hole direction; applying corrective measures to the drilling apparatus to rotate the drilling apparatus to a more desirable position when it is determined that the drilling apparatus is not maintaining proper hole direction, while at the same time maintaining such attitude detecting tool in the drilling apparatus; sending signals to the surface to provide a read out at the surface which is indicative of the orientation of the drilling apparatus relative to the downhole reference; changing bit direction while the tool is positioned in the drilling apparatus; and providing signals to the surface indicative of such directional changes.

2. A method of orienting drilling apparatus in a borehole while drilling is taking place including the steps of: providing an attitude detecting device in the borehole apparatus; passing a first signal to the surface indicative of the positional attitude of the detecting device relative to the borehole apparatus; passing a second signal to the surface indicative of a point in the borehole having a known relation to the earth's gravitation field; and comparing the signals to determine the relationship between the borehole apparatus and the earth's gravitational field.

3. An apparatus for orienting a device in a borehole, comprising: attitude detecting means; orienting means arranged for connection in a predetermined manner with the device to be oriented; means on said orienting means for receiving said attitude detecting means in a predetermined positional relationship; and means in said attitude detecting means for developing signals indicative of a point in the borehole having a known relation to the earth's surface and the positional attitude of the attitude detecting means, said signals developing means including pendulous means for providing a first signal indicative of the earth's gravitational field relative to means providing a second signal indicative of the position of a fixed point on the attitude detecting means.

4. The apparatus of claim 3 and further including means for transmitting said signals to the earth's surface; and means for providing a visual display of the angular relation between the point in the borehole and the positional attitude of the attitude detecting means.

5. The apparatus of claim 3 and further including means for transmitting said signals to the earth's surface.

6. The apparatus of claim 5 wherein said attitude detecting means is electrically operated and said transmitting means is a single conductor cable which is also used for transmitting an electrical power signal to said attitude detecting means.

7. The apparatus of claim 6 and further including means for superimposing said first and second signals on said power signal, and means at the surface for detecting said first and second signals on said power signal.

8. An apparatus for directionally orienting a drilling member in a borehole, comprising: a drill pipe having the drilling member attached thereto; an oriented member in said pipe and having a predetermined positional relationship relative to said drilling member; attitude detecting means arranged for positioning in said drill pipe in a fixed positional relationship with said oriented member; means for providing signals to the surface indicative of the relative position between said attitude detecting means and said drilling member, said signal providing means being arranged for remaining positioned in the drill pipe while drilling is taking place, said signal providing means including means providing a first signal to the surface indicative of a point in the borehole having a known relation to the earth's gravitational field and means providing a second signal to the surface indicative of the positional attitude of said attitude detecting device relative to said point in the borehole.

9. The apparatus of claim 8 and further including conductor means from said signal providing means to the surface for transmitting said signals to surface equipment providing visual indications of a relationship between said signals.

10. The apparatus of claim 9 wherein said surface equipment includes means for presenting said first and second signals on a circular scale in timed relation to the time relation at which such signals are provided to the surface by said signal providing means.

11. The apparatus of claim 8 wherein said signal providing means includes a pendulous member for seeking the lowest point in the borehole, and a scanning means for detecting such lowest point and a fixed point in the attitude detecting means having a predetermined positional relationship with the drilling member.

12. The apparatus of claim 11 wherein said signal providing means passes first and second signals to the surface indicative of the lowest point and the fixed point respectively detected by said scanning means and further including surface indicating means for providing a visual display of the time relation between said first and second signals.

13. The apparatus of claim 12 wherein said first and second signals are transmitted to the surface over a single conductor and further including means at the surface for distinguishing between said first and second signals and providing separate visual indications for each of said first and second signals.

14. An apparatus for orienting a device in a borehole, comprising: an elongated housing; signal generating means within said housing; a pendulous member mounted for rotation about a longitudinal axis in said housing; and means on said pendulous member for activating said signal generating means.

15. The apparatus of claim 14 wherein said signal generating means includes a light source and light sensitive means.

16. The apparatus of claim 15 wherein said activating means includes a cylindrical member arranged so that the wall of the cylindrical member passes between said light source and light sensitive member, and an opening in said wall to permit momentary light pulses to pass between said light source and said light sensitive means.

17. The apparatus of claim 14 wherein said pendulous member is comprised of a cylindrical member having a weighted portion oppositely disposed about its longitudinal axis to a buoyant portion.

18. The apparatus of claim 17 and further including a fluid enclosed within said housing.

19. The apparatus of claim 14 and further including scan means for continuously moving said signal generating means and activating means relative to one another.

20. The apparatus of claim 19 wherein said scan means includes a synchronous motor and further including surface indicating equipment responsive to the generated signals for presenting a visual display thereof, said surface indicating equipment including a synchronous motor for presenting visual surface indications in timed relation to the occurrence of the downhole generated signals.

21. The apparatus of claim 14 and further including conductor means from the surface for providing a power supply signal to said signal generating means, and means responsive to said signal generating means for superimposing a pulse on the power supply signal.

22. The apparatus of claim 21 wherein said superimposing means includes gate means operated by said signal generating means, and means generating a clock pulse timed with the power supply signal, said gate means being operable to pass said clock pulse onto said power supply signal.

23. The apparatus of claim 22 wherein said superimposing means further includes a semiconductor having as its collector load a capacitor in series with the power supply conductor and the output of said gate means causes conduction of said semiconductor.

24. The apparatus of claim 14 and further including means of said housing for activating said signal generating means.

25. The apparatus of claim 24 and further including means for applying signals generated by said signal generating means on a conductor in such a manner that signals activated by means on said housing are distinguishable from signals activated by means on said pendulous member.

26. The apparatus of claim 24 and further including synchronous motor means for providing relative movement between said signal generating means and both of said activating means, and surface means for providing a visual display of generated signals, said surface means including a synchronous motor for driving a portion of said surface means to provide a visual display of generated signals in time relation with the generation of such signals downhole.

27. The apparatus of claim 25 and including a single conductor for supplying a power signal to said signal generating means, wherein said applied signals are superimposed on the power signal on said single conductor, said applying means including first and second gate means, and clock means generating first and second pulses, said first gate means being operated by said first pulse and the pendulous member activating means, said second gate means being operated by said second pulse and the housing activating means.

28. The apparatus of claim 27 and further including means at the surface for separating the applied signals from the power signal.

29. The apparatus of claim 28 and further including means for separating signals applied through said first gate means from signals applied through said second gate means.

30. The apparatus of claim 29 and further including light means responsive to said separated signals for providing a visual indication of said applied signals.

31. In a borehole tool having means for detecting a downhole parameter, means for transmitting data indicative of such parameter to the surface over a single conductor also supplying alternating current power to the detecting means, which means comprises: means for producing a momentary pulse indicative of said downhole parameter, said pulse being substantially shorter in duration than the period of the power supply frequency; means for amplifying said pulse; means for lengthening the duration of said pulse so that said pulse is substantially as long in duration as the period of the power frequency; clock means providing a second pulse in a predetermined phase relation with the power frequency; gate means operated by said pulse, said gate means passing said second pulse; and means for superimposing said second pulse on the power frequency for transmission to the surface.

32. The apparatus of claim 31 wherein said superimposing means includes a semiconductor having as its collector load a capacitor in series with the power supply conductor, said second pulse passed by said gate means causing conduction of said semiconductor.

33. In a borehole tool having means for determining the boundaries of a downhole parameter, means for transmitting data indicative of such parameter boundaries to the surface over a single conductor also supplying AC power to the boundary determining means, which means comprises: means for providing first and second momentary pulses indicative of the boundaries of the borehole parameter, said pulses being substantially shorter in duration than the period of the power supply; means for amplifying said pulses; means for lengthening the duration of said pulses so that said pulses are substantially as long as the period of the power supply; clock means providing first and second clock signals having a short duration, said first and second clock signals each having a different predetermined phase relation with the power supply; first and second gate means operated by said first and second pulses respectively, said gate means passing said first and second clock signals respectively; and means for superimposing said first and second clock signals passed by said gate means onto the power supply for transmission to the surface.

34. The apparatus of claim 33 and further including surface means for separating said superimposed signals from the power supply signal, means for separating said first superimposed clock signal from said second superimposed clock signal, and means responsive to said separated clock signals for providing a visual indication of the borehole parameter defined by said first and second pulses.

35. In a borehole system having means for detecting a downhole parameter and supplying signals indicative of the limits of the parameter to the surface over the power supply signal conductor, which means comprises: downhole means for superimposing first and second pulses on the power supply signal at different predetermined phase relations with the power supply signal; surface means for rejecting the power supply signal and detecting said first and second pulses; means for separating said first and second pulses after rejection of said power supply signal by comparing said pulses with the different predetermined phase relations of the pulses with the power supply signal; and means responsive to said separated first and second pulses for providing visual indications of the limits of said downhole parameter.

36. The system of claim 35 wherein said visual indication providing means is comprised of scale means, light generating means, means for conducting light from said generating means to said scale means, and means for operating said light generating means in time relation to said first and second pulses.

37. A method of orienting a borehole drilling apparatus including a drilling device and an angled section of pipe positioned in a drill string above the drilling device, comprising the steps of: positioning an attitude detecting means in the drill string so that the detecting means has a predetermined fixed positional relationship with the angled section of pipe; during the drilling operation detecting a point in the borehole having a known relation to the earth's gravitational field; providing a first signal which is indicative of the position of a fixed point on the detecting means; providing a second signal which is indicative of the position of an element in the detecting means having a fixed relation with the earth's gravitational field, such first and second signals having a time ratio relation indicative of angular distance; comparing the first and second signals to determine the position of the angled pipe relative to the earth's gravitational field.

38. The method of claim 37 and further including passing the first and second signals to the earth's surface to provide an indication at the surface of such position of the angled pipe.

39. The method of claim 37 further including the step of passing a power signal over a single conductor to the detecting means in a borehole and superimposing the first and second signals on the power signal for transmission to the earth's surface.

40. Apparatus for use in a drill string for orienting a drill in a borehole with respect to the earth's gravitational field, comprising: a housing adapted for suspension in the drill string on a conductor cable, means in the drill string for directing the drilling operation in an angular direction relative to the overall longitudinal axis of the drill string adjacent the directing means; means within said drill string for receiving said housing in a predetermined positional attitude relative to the directing means; means in said housing for providing a first signal indicative of the position of a point on said housing which is fixedly related in a predetermined manner with the directing means; means in said housing for providing a second signal indicative of an element in the housing having a fixed relation with the earth's gravitational field; and means for correlating said first and second signals to determine the position of said directing means with respect to the earth's gravitational field.

41. The apparatus of claim 40 and further including means for providing a power signal to the borehole apparatus over the conductor cable, means for superimposing said first and second signals on said power signal, and surface means for detecting said first and second signals on said power signal.

42. A method of orienting a drilling apparatus in a borehole with respect to the earth's gravitational field, comprising the steps of: positioning a landing device in a drill string for receiving an instrument therein and orienting the instrument with respect to a bent sub in the drill string, passing the drill string into the borehole; passing the instrument into the landing device on a conductor cable; passing a power supply signal to the instrument over the conductor cable for operating the instrument; operating the instrument to provide a first signal over the conductor cable to the earth's surface, which first signal is determinative of a point on the instrument having a fixed relation to the bent sub; further operating the instrument to provide a second signal over the conductor cable to the earth's surface, which second signal is determinative of the angular position of the point on the instrument with respect to the earth's gravitational field; and using the first and second signals to provide a surface indication of the angular position of the bent sub with respect to the earth's gravitational field.

References Cited

UNITED STATES PATENTS

| | | | |
|---|---|---|---|
| 2,658,284 | 11/1953 | Arps | 175—45 |
| 2,232,360 | 2/1941 | Barnett | 33—205.5 R |
| 3,052,309 | 9/1962 | Eastman | 175—45 |
| 1,411,896 | 4/1922 | Kaempfe | 175—45 |
| 2,925,251 | 2/1960 | Arps | 340—18 LD |
| 3,037,295 | 6/1962 | Roberson | 33—205 |
| 3,149,683 | 9/1964 | Clements et al. | 33—205.5 R |
| 3,209,323 | 9/1965 | Grossman, Jr. | 340—18 LD |
| 3,274,694 | 9/1966 | Hilderbrandt | 33—205 |
| 3,448,612 | 6/1969 | Lebourg | 175—45 |
| 3,466,597 | 9/1969 | Richter, Jr., et al. | 340—18 |

JAMES A. LEPPINK, Primary Examiner

U.S. Cl. X.R.

33—205.5 R; 175—107; 340—18 LD